(12) United States Patent
Chao et al.

(10) Patent No.: US 8,638,398 B2
(45) Date of Patent: *Jan. 28, 2014

(54) CURSOR CONTROL METHOD AND APPARATUS

(75) Inventors: Tzu Yi Chao, Hsin-Chu (TW); Meng Tsung Wu, Hsin-Chu (TW); Hsin Chia Chen, Hsin-Chu (TW); Chih Hsin Lin, Hsin-Chu (TW); Chang Che Tsai, Hsin-Chu (TW); Chao Chien Huang, Hsin-Chu (TW); Yi Fang Lee, Hsin-Chu (TW)

(73) Assignee: PixArt Imaging, Inc., Hsin-Chu County (TW)

( * ) Notice: Subject to any disclaimer, the term of this patent is extended or adjusted under 35 U.S.C. 154(b) by 96 days.

This patent is subject to a terminal disclaimer.

(21) Appl. No.: 13/349,612

(22) Filed: Jan. 13, 2012

(65) Prior Publication Data

US 2012/0113000 A1    May 10, 2012

Related U.S. Application Data

(63) Continuation of application No. 11/965,624, filed on Dec. 27, 2007, now Pat. No. 8,169,550.

(30) Foreign Application Priority Data

Dec. 28, 2006    (TW) .............................. 95149408 A (51) Int. Cl.
*H04N 5/44* (2011.01)
(52) U.S. Cl.
USPC .............................. 348/734; 345/158; 463/38
(58) Field of Classification Search
None
See application file for complete search history.

(56) References Cited

U.S. PATENT DOCUMENTS

| 5,574,479 | A | 11/1996 | Odell |
| 6,346,891 | B1 | 2/2002 | Feinleib et al. |
| 6,426,820 | B1 | 7/2002 | Verzulli |
| 6,738,041 | B2 | 5/2004 | Silber |
| 7,102,616 | B1 | 9/2006 | Sleator |
| 2005/0110751 | A1 | 5/2005 | Wilson et al. |
| 2005/0175218 | A1 | 8/2005 | Vertegaal et al. |
| 2006/0239121 | A1 | 10/2006 | Kong et al. |
| 2007/0052177 | A1 | 3/2007 | Ikeda et al. |
| 2008/0174702 | A1 | 7/2008 | Wu |

FOREIGN PATENT DOCUMENTS

JP    S60176127 A    9/1985

(Continued)

OTHER PUBLICATIONS

Notice of Reasons for Rejections issued in Application No. 2012-046626 dated Jul. 30, 2013.

*Primary Examiner* — Jason J Chung (57) ABSTRACT

A cursor control method for controlling a cursor on an image display includes: providing at least two reference points for generating light of a predetermined spectrum and defining a predetermined area; providing an image sensor pointing inside the predetermined area; receiving the light of the predetermined spectrum by the image sensor to form a digital image; identifying positions and shapes of the images of the reference points on the digital image to form a first parameter; performing distance and angle compensations on the first parameter; moving the aiming point of the image sensor inside the predetermined area to form a second parameter; and calculating an displacement of the images of the reference points on the digital image according to the compensated first and second parameters so as to accordingly control the cursor. The present invention further provides a cursor control apparatus.

3 Claims, 7 Drawing Sheets

(56) References Cited

FOREIGN PATENT DOCUMENTS

| | | |
|---|---|---|
| JP | 2212921 | 8/1990 |
| JP | 5035401 | 2/1993 |
| JP | H06308879 A | 11/1994 |
| JP | 2001331269 | 11/2001 |
| TW | 588258 | 5/2004 |
| TW | 200540687 | 12/2005 |
| WO | 2006076557 | 7/2006 |

CURSOR CONTROL METHOD AND APPARATUS

CROSS REFERENCE TO RELATED APPLICATION

This application is a continuation of prior U.S. application Ser. No. 11/965,624, filed Dec. 27, 2007 and claims the priority benefit of Taiwan Patent Application Serial Number 095149408, filed on Dec. 28, 2006, the full disclosure of which is incorporated herein by reference.

BACKGROUND OF THE INVENTION

1. Field of the Invention

This invention generally relates to a cursor control method and an apparatus, and more particularly to a method and an apparatus for controlling a user interactive cursor shown on an image display.

2. Description of the Related Art

A conventional pointer positioning device and method is disclosed in Taiwan Patent No. 588258 and entitled "A photographic pointer positioning device". It utilizes a photographic pointer positioning device to process the image outline so as to obtain coordinate values of four corners of display area, and then obtain the coordinate values corresponding to the aiming point of a video camera by coordinate calculating process so as to replace the method of obtaining the coordinate values of the aiming point by aiming point signals and synchronizing signals utilized in the traditional light gun system. However in practical use, although this method can be applied to any types of image display for playing shooting games with the photographic pointer positioning device without being limited by the type of image display, the image recognition process of the display area detected by video camera is still complicated due to containing pictures shown on the image display. Furthermore, the video camera has to detect the whole display area no matter which point is aimed by the photographic pointer positioning device; therefore the method further has the problem of needing a video camera with large viewing angle.

A conventional cursor control method is disclosed in Taiwan Patent Publication No. 200540687 and entitled "Apparatus for cursor control and method thereof", wherein a method for cursor control using a hand-held device is provided. First, a movement is detected by the hand-held device. A position differential is calculated according to the detected movement. Then, the hand-held device transmits the position differential to a specific device wirelessly to control cursor activity accordingly, and operate application software on the specific device according to the cursor activity. However in practical use, when the hand-held device is used by a user to detect an image area, image positions will be obviously affected according to different distances between the hand-held device and the objects to be captured and different rotation angles of the hand-held device during photographing. If the distance and rotation angle variations are not corrected, errors may be generated during the calculation of the position differential. Furthermore, since the images detected by the hand-held device include other objects, e.g. pictures shown on a display screen, image recognition is complicated.

According to the above reasons, it is necessary to further improve the aforementioned cursor control method and apparatus so as to solve the problems existed in the art.

SUMMARY OF THE INVENTION

It is an object of the present invention to provide a cursor control method and apparatus, wherein a cursor on an image display is controlled by using an image sensor to detect the light of a predetermined spectrum generated by at least two reference points, wherein the rotation angle of the image sensor and the distance between the image sensor and the reference points are corrected during operation so as to increase the accuracy of cursor control.

It is another object of the present invention to provide a cursor control method and apparatus, wherein locations of at least two reference points which can generate light of a predetermined spectrum can be determined by a user during operation so as to increase the operating convenience.

It is a further object of the present invention to provide a cursor control method and apparatus, wherein a cursor on an image display is controlled by using an image sensor to detect the light of a predetermined spectrum generated by at least two reference points. Meanwhile, the motion sensitivity of the cursor can be controlled by means of altering a scale factor.

It is a further object of the present invention to provide a cursor control method and apparatus, wherein a cursor on an image display is controlled by using an image sensor to detect the light of a predetermined spectrum generated by at least two reference points, wherein the image sensor can detect the light only from the reference points so as to simplify the image recognition.

In order to obtain the above objects, the cursor control method of the present invention is for controlling the movement of a cursor on an image display and includes the following steps: providing at least two reference points for generating light of a predetermined spectrum and defining a predetermined area; providing an image sensor for pointing inside the predetermined area; receiving the light of the predetermined spectrum by the image sensor to form a digital image; identifying positions and shapes of the images of the reference points on the digital image to form a first parameter; performing distance and angle compensations on the first parameter; moving the aiming point of the image sensor inside the predetermined area to form a second parameter; and calculating a displacement of the images of the reference points on the digital image according to the compensated first parameter and the second parameter so as to accordingly control the movement of the cursor.

According to another aspect of the present invention, the cursor control apparatus of the present invention is for controlling the movement of a cursor on an image display and includes at least two reference points, an image sensor and a processing unit. The reference points are for generating light of a predetermined spectrum and defining a predetermined area. The image sensor is for pointing inside the predetermined area to receive the light of the predetermined spectrum to form a digital image. The processing unit receives the digital image so as to accordingly control the movement of the cursor according to a displacement of the images of the reference points on the digital image.

The present invention further provides a television remote control apparatus includes a television, at least two reference points and a remote controller. The television has a user interface for function setting and tuning and a cursor is shown on the screen of the television for controlling the user interface. The reference points are for generating light of a predetermined spectrum and defining a predetermined area. The remote controller includes an image sensor for pointing inside the predetermined area to receive the light of the predetermined spectrum so as to form a digital image and a processing unit, which is electrically coupled to the image sensor, for accordingly control the movement of the cursor according to a displacement of the images of the reference points on the digital image.

The cursor control method of the present invention can be adapted to the cursor control of any image display, e.g. cursor control of a computer screen, cursor control of the display screen of a game machine and cursor control of the user interface on a television screen.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

It should be noticed that, wherever possible, the same reference numbers will be used throughout the drawings to refer to the same or like parts.

Figure 1A:
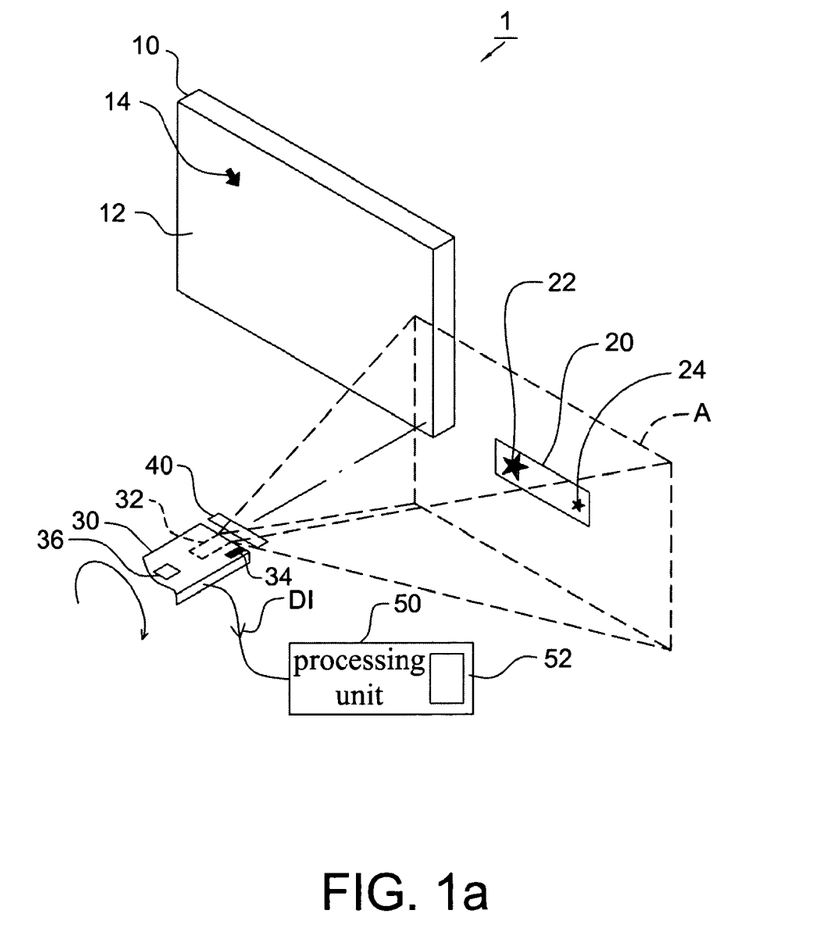
FIG. 1a shows a schematic view of the cursor control apparatus according to the first embodiment of the present invention.

Referring to FIG. 1a, it schematically shows the cursor control apparatus 1 according to the first embodiment of the present invention. The cursor control apparatus 1 includes an image display 10, at least two reference points 22 and 24, a remote controller 30, an image sensor 32, an optical filter 40 and a processing unit 50. Embodiments of the image display 10 include a computer screen, a television, a game machine and any apparatus for displaying images. Preferably, function setting and tuning of the image display 10 are implemented by means of a user interface, and a cursor 14 is shown on the screen 12 of the image display 10 for a user to perform interactive control, e.g. volume control, sound effects control and color control etc, on the user interface through the cursor 14 so as to humanize the operation of the image display 10. According to different types of the image display 10, the remote controller 30 may be a remote controller of a computer screen, a TV remote controller or a remote controller of a game machine.

The reference points 22 and 24 can generate light of a predetermined spectrum, e.g. infrared spectrum, and they may be emitting light sources which can emit the light of the predetermined spectrum, e.g. IR LEDs, or non-emitting light sources which can reflect the light of the predetermined spectrum, e.g. IR mirrors. If the reference points 22 and 24 are non-emitting light sources, preferably the cursor control apparatus 1 further includes a light source 34, which may be integrated on the remote controller 30, for providing the light of the predetermined spectrum for being reflected by the reference points 22 and 24. In other embodiment, the reference points 22 and 24 can directly reflect the light from environmental light sources. In one embodiment, the reference points 22 and 24 are manufactured as an independent reference device 20. The reference device 20 can be located at any desired place during operation so as to increase its operational convenience, such that a user need not to aim the remote controller 30 at the image display 10 during operation but only need to aim at the reference device 20 which is located at any place that can be seen by the user. In addition, the reference points 22 and 24 preferably have different shapes, e.g. one is a stripe shape (formed by arranging a plurality of IR LEDs in line) and the other is a dot shape; the reference points 22 and 24 also may be dot shapes with different sizes. In another embodiment, the cursor control apparatus 1 has four reference points, wherein three of them are dot shapes and the rest is stripe shape. In an alternative embodiment, the reference points may have identical shapes and sizes. By using reference points 22 and 24 with different shapes, it is able to recognize each of the reference points 22 and 24 when the remote controller 30 is operated under a rotation angle larger than 180 degrees. When the reference points are identical in sizes and shapes, preferably a mercury switch 36 is integrated in the remote controller 30 such that each of the reference points 22 and 24 can be recognized when the remote controller 30 is operated with a rotation angle larger than 180 degrees and the remote controller 30 can control the cursor correctly within 360 degrees rotation angle. The detailed descriptions will be illustrated in the following paragraphs.

The image sensor 32 can be integrated in the remote controller 30. The image sensor 32 may be an image sensor of the predetermined spectrum, e.g. an infrared image sensor, for detecting the light from the reference points 22 and 24. Since the light with a spectrum outside the predetermined spectrum, e.g. light from the screen 12 of the image display 10, will not be received by the image sensor 32, the complexity of image recognition process can be significantly decreased. The image sensor 32 can be constructed from disposing the optical filter 40 in front of a normal image sensing apparatus, e.g. a CMOS image sensor or a CCD image sensor, having high frame rate (200 frames/second), and the optical filter 40 may be an infrared optical filter which is integrated in the remote controller 30 such that the image sensor 32 can detect the light only from the reference points 22 and 24. According to the viewing angle of the image sensor 32, a predetermined area "A" can be determined surrounding the reference points 22 and 24. After the image sensor 32 detects the light from the reference points 22 and 24, a digital image "DI" will be transmitted to the processing unit 50.

After receiving the digital image "DI" from the remote controller 30, the processing unit 50 calculates position, distance and shape parameters of the images of the reference points 22 and 24 accordingly, performs distance and angle compensations on the images captured by the image sensor 32 according to these parameters, and calculates a displacement of the images of the reference points 22 and 24 on the digital image. In one embodiment, a wireless unit 52 is further disposed in the processing unit 50 such that the processing unit 50 can wirelessly communicate with the image display 10 thereby controlling the cursor 14 shown on the image display 10 to act accordingly according to the displacement of the images of the reference points 22 and 24 calculated by the processing unit 50, and the detailed descriptions will be illustrated in the following paragraphs. In addition, it should be understood that, the processing unit 50 can be integrated in the remote controller 30 or in the image display 10. Moreover, the processing unit 50 are preferably stored with a predetermined position parameter and a predetermined distance parameter of the images of the reference points 22 and 24 on the digital image captured by the image sensor 32 operated at a predetermined distance from the reference points, and these parameters are pre-stored in the processing unit 50 before the cursor control apparatus 1 leaves the factory.

Figure 1B:
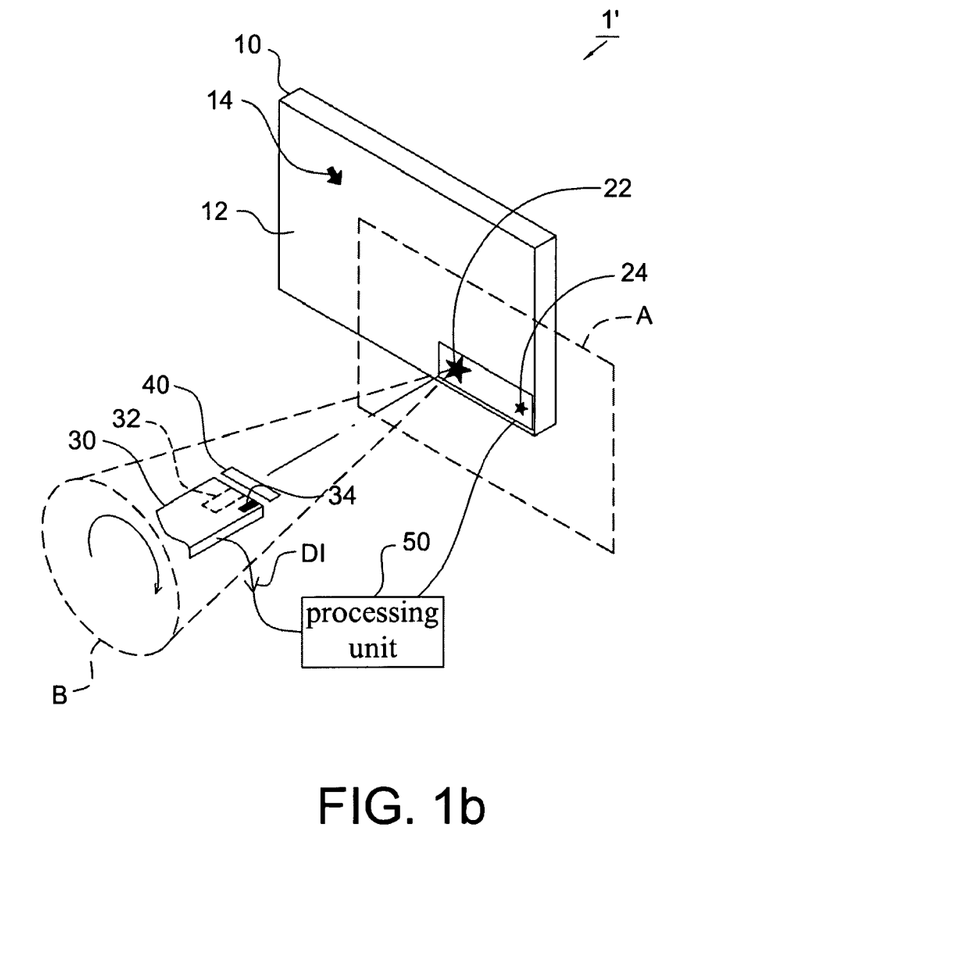
FIG. 1b shows a schematic view of the cursor control apparatus according to the second embodiment of the present invention.

Referring to FIG. 1b, it shows the cursor control apparatus 1' according to the second embodiment of the present invention. The cursor control apparatus 1' also includes the image display 10, the reference points 22 and 24, the remote controller 30, the image sensor 32, the optical filter 40 and the processing unit 50. The motion of the cursor 14 on the screen 12 of the image display 10 is also controlled by the processing unit 50 through calculating the displacement of the images of the reference points 22 and 24 detected by the image sensor 32. The differences between this embodiment and the first embodiment are that the reference points 22 and 24 are integrated on the image display 10, and preferably are located at the front panel of the image display 10. In this manner, an emitting area "B" can be formed in front of the image display 10 according to emitting angles of the reference points 22 and 24, and the light of the predetermined spectrum generated from the reference points 22 and 24 can be detected by the image sensor 32 whenever operated in the emitting area "B". In addition, the processing unit 50 is electrically coupled to the image display 10 so as to accordingly control the motion of the cursor 14 shown on the screen 12 of the image display 10 according to the displacement of the images of the reference points 22 and 24 on the digital image calculated by the processing unit 50. In addition, for simplification, FIG. 1a only shows the viewing angle of the image sensor 32 while FIG. 1b only shows the emitting area "B" determined by the emitting angle of the reference point 22. However, it should be understood that the viewing angle shown in FIG. 1a also exists in FIG. 1b, and the emitting angle shown in FIG. 1b also exists in FIG. 1a. The emitting area "B" is determined by the emitting angles of the reference points 22 and 24 together.

Figure 2A:
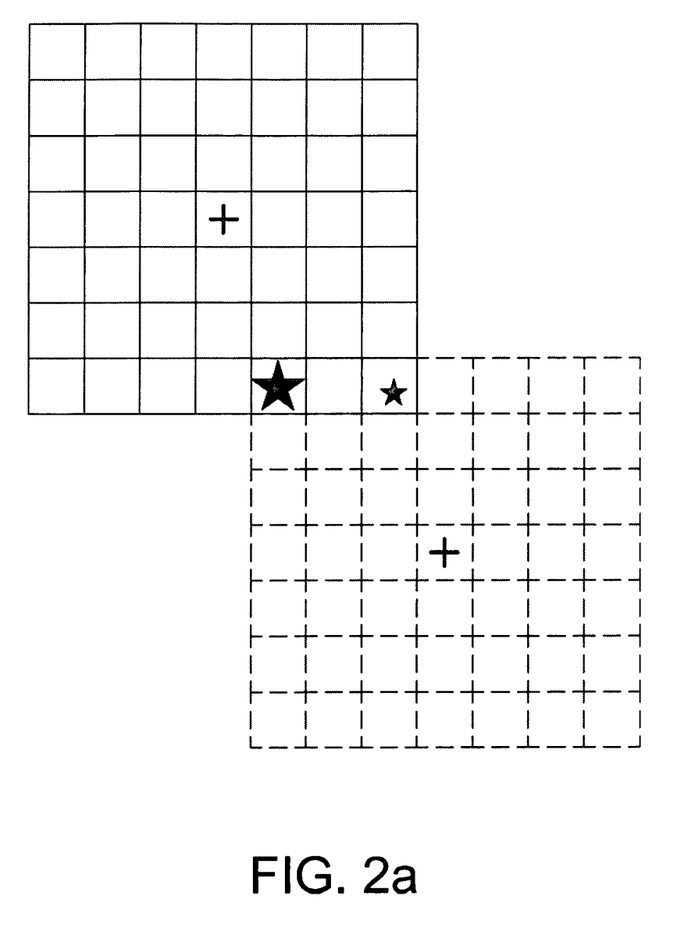
FIG. 2a shows schematically a sensible area of the image sensor according to the embodiments of the present invention, wherein images of the reference points are respectively shown at the right-bottom and left-top corners of the viewing angle of the image sensor.
Figure 2B:
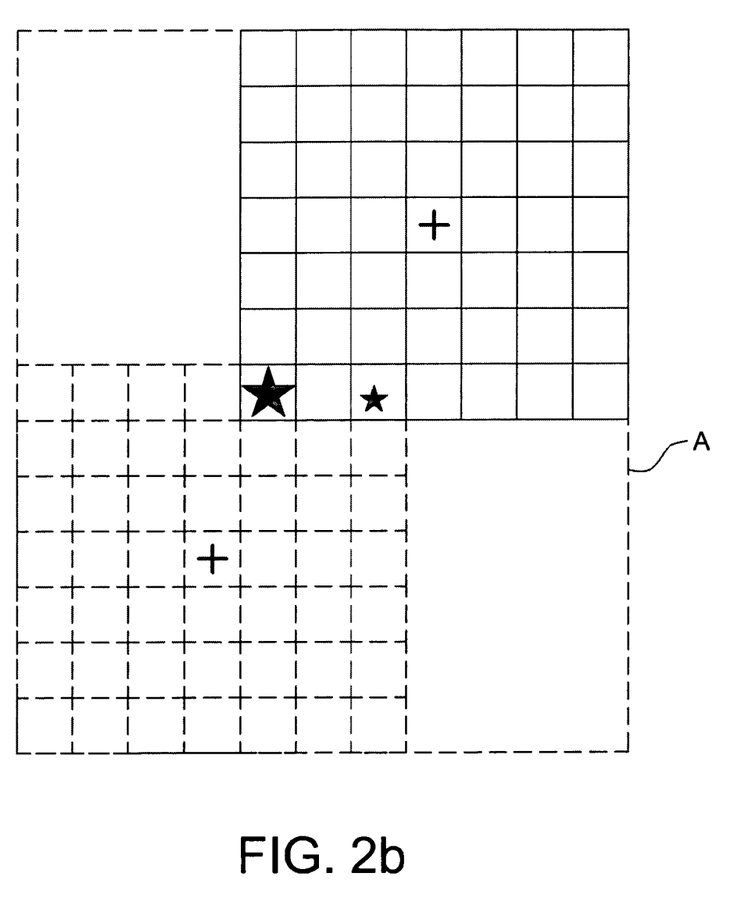
FIG. 2b shows schematically another sensible area of the image sensor according to the embodiments of the present invention, wherein images of the reference points are respectively shown at the left-bottom and right-top corners of the viewing angle of the image sensor.

Referring to FIGS. 1b, 2a and 2b, they schematically illustrate a sensible area in which the image sensor 32 is able to detect the light from the reference points 22 and 24, and the sensible area is determined by the viewing angle of the image sensor 32 and the emitting areas of the reference points 22 and 24 together. For simplification, the viewing angle area of the image sensor 32 is represented by a 7×7 sensing array, and it can be understood that the size of the sensing array is determined by different requirements of products. When the image sensor 32 is operated inside the emitting area "B", a sensible area "A" surrounding the reference points 22 and 24 (containing the reference points 22 and 24) in which the light from the reference points 22 and 24 can be detected by the image sensor 32 can be defined. FIG. 2a shows digital images captured by the image sensor 32, wherein the images of the reference points 22 and 24 respectively appear at the right-bottom corner (shown as solid line) and the left-top corner (shown as dotted line) of the viewing angle of the image sensor 32, and the symbol "+", which may not be shown on the digital images in actual operation, denotes the center of the sensing array of the image sensor 32. Similarly, FIG. 2b shows the digital images captured by the image sensor 32, wherein the images of the reference points 22 and 24 respectively appear at the left-bottom corner (shown as solid line) and the right-top corner (shown as dotted line) of the viewing angle of the image sensor 32. According to FIGS. 2a and 2b, it is able to define the sensible area "A".

Figure 3:
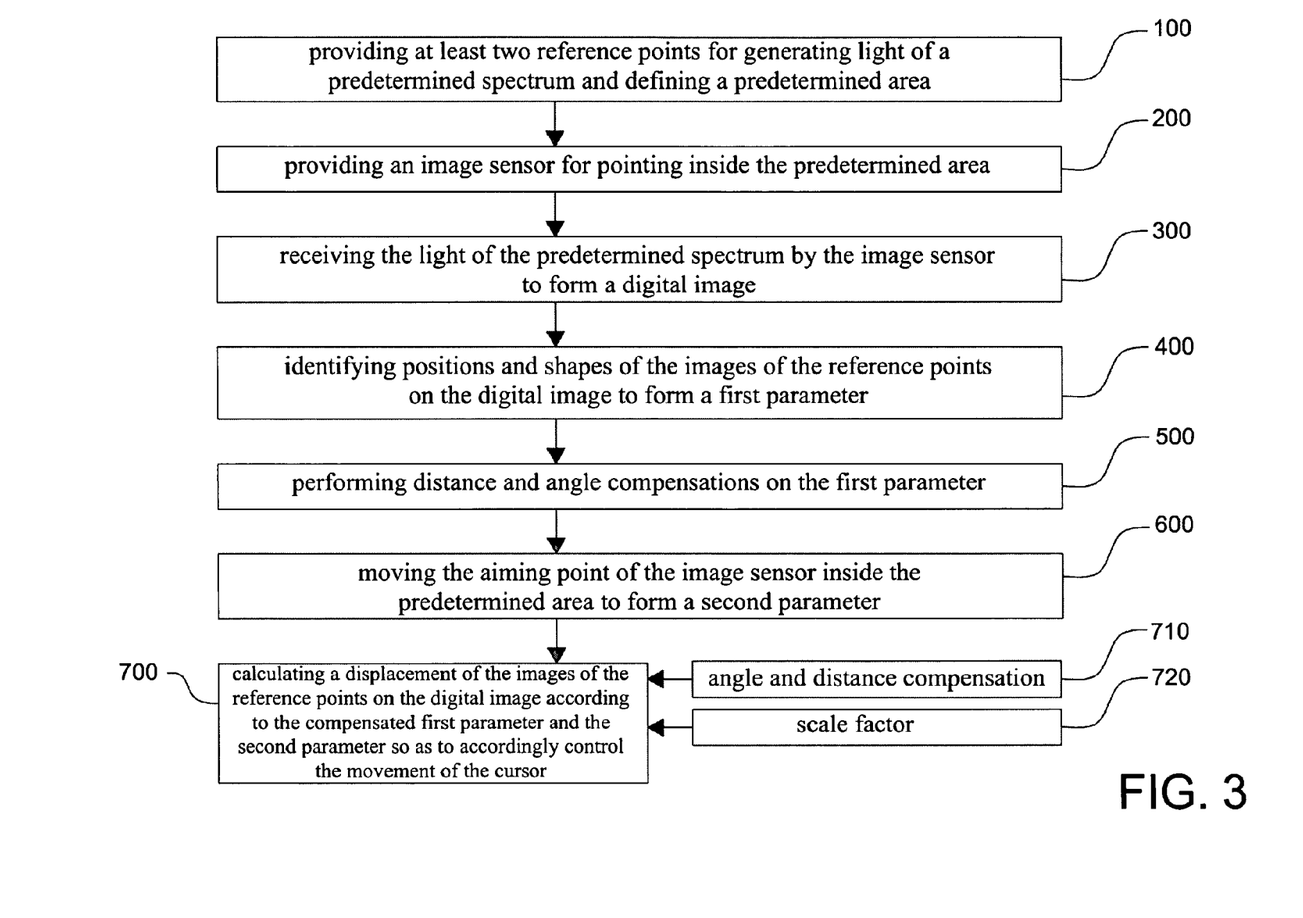
FIG. 3 shows a flow chart of the cursor control method according to the embodiments of the present invention.

Referring to FIG. 3, it shows a flow chart of the cursor control method, which can be adapted to both the aforementioned cursor control apparatuses 1 and 1', according to the embodiment of the present invention. The cursor control method includes the steps of: providing at least two reference points for generating light of a predetermined spectrum and defining a predetermined area surrounding the reference points (step 100); providing an image sensor for pointing inside the predetermined area (step 200); receiving the light of the predetermined spectrum with the image sensor to form a digital image (step 300); identifying positions and shapes of the images of the reference points on the digital image to form a first parameter (step 400); performing distance and angle compensations on the first parameter (step 500); moving the aiming point of the image sensor inside the predetermined area to form a second parameter (step 600); and calculating a displacement of the images of the reference points on the digital image according to the compensated first parameter and the second parameter so as to accordingly control the movement of the cursor (step 700), wherein in step 700, distance and angle compensations are simultaneously held on the second parameter (step 710) and a scale factor may be inputted so as to control the motion sensitivity of the cursor (step 720), wherein step 720 can be omitted.

Figure 4A:
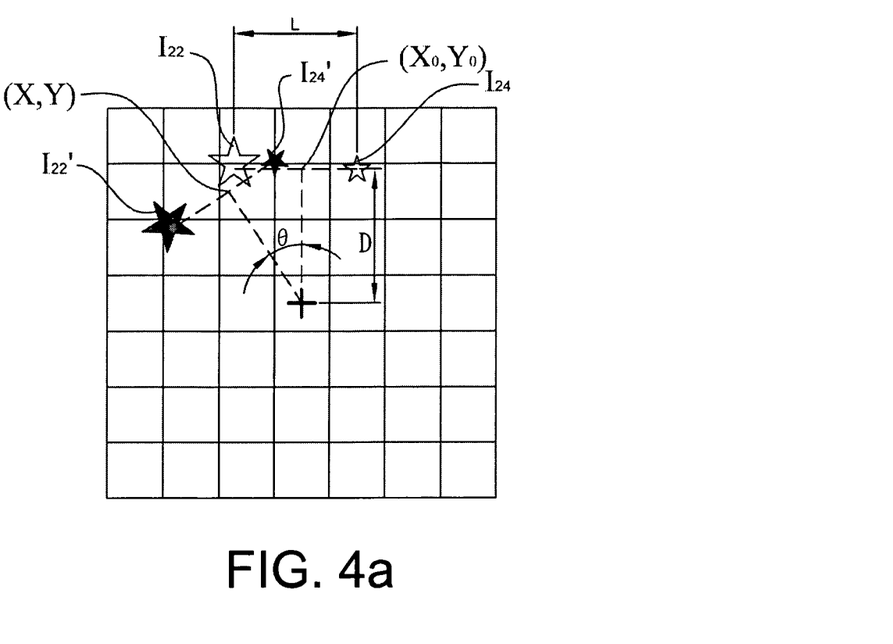
FIG. 4a schematically shows images of the reference points captured by the image sensor according to the embodiments of the present invention, wherein a rotation angle difference smaller than 180 degrees is shown between the current detected images and the predetermined images.

Referring to FIGS. 1a, 3 and 4a, the cursor control method will be illustrated according to the cursor control apparatus 1 of the first embodiment of the present invention, and since the cursor control method adapted to the second embodiment is similar to that adapted to the first embodiment, the detailed descriptions will not be illustrated herein. As mentioned above, before the cursor control apparatus 1 leaves the factory, a predetermined position parameter and a predetermined distance parameter are preferably pre-stored in the processing unit 50. These parameters can be obtained according to predetermined images $I_{22}$ and $I_{24}$ of the reference points 22 and 24 captured by the image sensor 32, as shown in FIG. 4a, operating at a distance, e.g. 3 meters, from the reference points 22 and 24, and served as the basis for distance and angle compensations. For example, the predetermined position and distance parameters can be defined according to a plane space formed by the sensing array of the image sensor 32, e.g. a plane space having the center of the sensing array "+" as the original point. In one embodiment, the predetermined position parameter may include an average coordinate $(X_0, Y_0)$ of the predetermined images $I_{22}$ and $I_{24}$ of the reference points 22 and 24; the predetermined distance parameter may include a distance "L" between the predetermined images $I_{22}$ and $I_{24}$ of the reference points 22 and 24, and a distance "D" between the average coordinate $(X_0, Y_0)$ of the predetermined images $I_{22}$ and $I_{24}$ and the center of the sensing array "+" of the image sensor 32.

First, it is assumed that the reference points 22 and 24 are integrated on an independent reference device 20 such that the reference device 20 can be placed at any desired location which can be seen by a user during operation. The reference points 22 and 24 generate light of a predetermined spectrum, e.g. infrared spectrum, and it is assumed that the area of the reference point 22 is larger that that of the reference point 24. In this manner, an image sensible area "A" surrounding the reference points 22 and 24 can be determined according to the viewing angle of the image sensor 32 and the emitting angles of the reference points 22 and 24 (step 100). Next, the image sensor 32 of the remote controller 30 is pointed at any place inside the image sensible area "A" (step 200). Since the image sensor 32 of the present invention can only detect the light of the predetermined spectrum, or an optical filter 40 of the predetermined spectrum is disposed in front of the image sensor 32, only the images of the reference points 22 and 24 will appear on the sensing array of the image sensor 32 (step 300), shown as the images $I_{22}'$ and $I_{24}'$ in FIG. 4a. Because the remote controller 30 is rotated clockwise by an angle θ while capturing the digital images, as the arrow direction shown in FIG. 1a, a rotation angle difference θ exists between the current images $I_{22}'$ and $I_{24}'$ and the predetermined images $I_{22}$ and $I_{24}$ captured by the image sensor 32 at aforementioned predetermined distance. In this manner, the average coordinate (X, Y) of the images $I_{22}'$ and $I_{24}'$ dose not coincide with the average coordinate $(X_0, Y_0)$ of the predetermined images $I_{22}$ and $I_{24}$ of the reference points although the image sensor 32 is pointed at identical position in these two statuses.

Referring to FIGS. 1a, 3, 4a and 4b, after the digital image "DI" is transmitted to the processing unit 50, the processing unit 50 identifies positions and shapes of the images $I_{22}'$ and $I_{24}'$ of the reference points so as to form a first parameter which includes a first position parameter, a first distance parameter and an image shape parameter (step 400). The processing unit 50 performs the angle compensation according to the rotation angle difference θ between the first position parameter (including the average coordinate of the images $I_{22}'$ and $I_{24}'$ and the tilt angle of their connecting line) and the predetermined position parameter (including the coordinates of the predetermined images $I_{22}$ and $I_{24}$ and the tilt angle of their connecting line) (step 500). The angle compensation is implemented according to equation (1), $$\begin{bmatrix} X' \\ Y' \end{bmatrix} = \begin{bmatrix} \cos(\theta) & -\sin(\theta) \\ \sin(\theta) & \cos(\theta) \end{bmatrix} \begin{bmatrix} X \\ Y \end{bmatrix} \quad (1)$$

where θ denotes a rotation angle difference between the first position parameter and the predetermined position parameter; X and Y denote the average coordinates of the first position parameter before being compensated; X' and Y' (not shown) denote the average coordinates after being compensated. After the rotation angle difference is compensated, the images of the reference points 22 and 24 are compensated to images under the same basis, i.e. the image sensor 32 can capture identical images under any rotation angle as long as a user operating the remote controller 30 at a constant distance from the image display 10 and aiming at the same point.

Figure 4B:
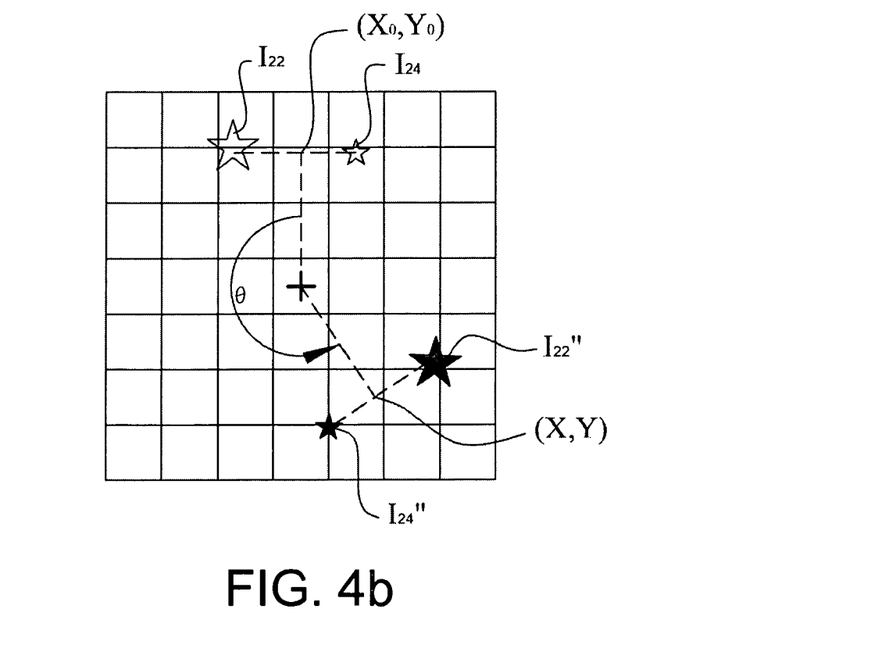
FIG. 4b schematically shows images of the reference points captured by the image sensor according to the embodiments of the present invention, wherein a rotation angle difference larger than 180 degrees is shown between the current detected images and the predetermined images.

However, if the rotation angle difference θ is larger than 180 degrees so as to form the images $I_{22}''$ and $I_{24}''$ shown in FIG. 4b, and there is no difference between the reference points 22 and 24, i.e. having identical sizes and shapes, it is unable to distinguish that the images $I_{22}''$ and $I_{24}''$ are formed from rotating or from moving the images $I_{22}'$ and $I_{24}'$ shown in FIG. 4a. Therefore in this embodiment, two reference points 22 and 24 with different sizes are utilized, and the individual positions of images of the reference points 22 and 24 are identified first according to the image shape parameter, e.g. areas of the images of the reference points, obtained by the processing unit 50, and then the rotation angle compensation is performed. In this manner, the angle compensation can be correctly performed even though the rotation angle of the image sensor 32 during operation exceeds 180 degrees. In an alternative embodiment, a mercury switch 36 is disposed in the remote controller 30 such that the angle compensation can also be correctly performed even though the rotation angle of the image sensor 32 during operation exceeds 180 degrees.

Figure 5:
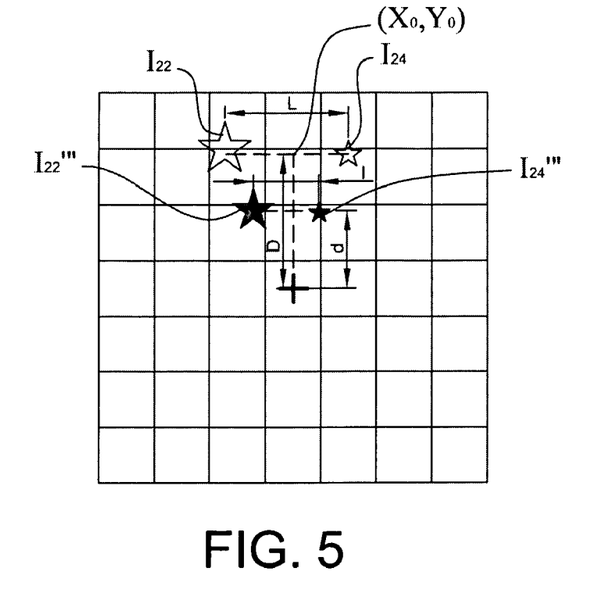
FIG. 5 schematically shows images of the reference points captured by the image sensor according to the embodiments of the present invention, wherein distance and position deviations of the images of the reference points are shown under different photographing distance.

Referring to FIG. 5, it shows a method for distance compensation utilized in the embodiment of the present invention, but it is not used to limit the present invention. During the time the image sensor 32 of the remote controller 30 captures the images of the reference points 22 and 24, if the distance between the remote controller 30 and the reference device 20 becomes larger, the captured images of the reference points will become smaller and the average coordinate of the captured images of the reference points will become closer to the center "+" of the sensing array. However, the position deviation caused by this action does not represent that the user changes the aiming point of the remote controller 30. If this kind of position deviation is not corrected, the change of photographing distance could be misrecognized as the movement of aiming point of the remote controller 30 such that errors could be introduced during the calculation of the average coordinate (X, Y) of the images of the reference points 22 and 24. In the illustration herein, it is assumed that a distance between two predetermined images $I_{22}$ and $I_{24}$ is "L" and a distance between the average coordinate $(X_0, Y_0)$ of the predetermined images $I_{22}$ and $I_{24}$ of the reference points and the center "+" of the sensing array is "D" (predetermined distance parameter); a distance between two images $I_{22}'''$ and $I_{24}'''$ is "l" and a distance between the average coordinate of the images $I_{22}'''$ and $I_{24}'''$ of the reference points and the center "+" of the sensing array is "d" (first distance parameter). In this manner, the distance deviation can be compensated according to equation (2) (step 500):

$$\frac{D}{L} = \frac{d}{l} \quad (2)$$

Figure 6:
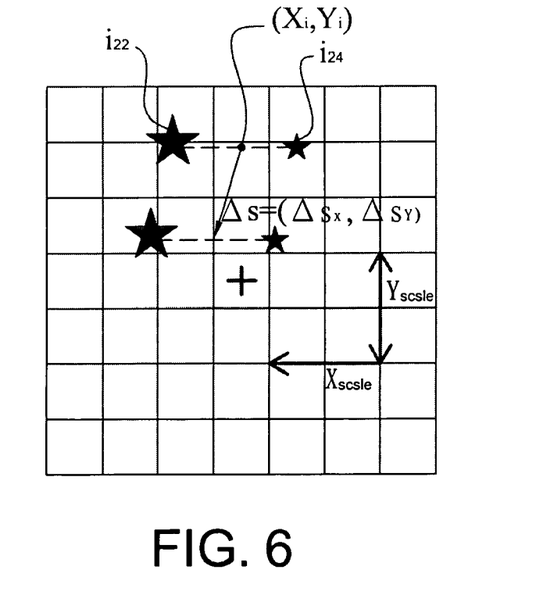
FIG. 6 schematically shows images of the reference points captured by the image sensor according to the embodiments of the present invention, wherein a displacement is formed by moving the aiming point of the image sensor.

Referring to FIG. 6, it is assumed that the images after being compensated become $i_{22}$ and $i_{24}$, which are images based on the same predetermined distance and rotation angle basis, and their average coordinate is $(X_i, Y_i)$. Then move the aiming point of the remote controller 30 inside the image sensible range "A" (step 600) and the image sensor 32 continuously transmit signals of the digital image "DI" to the processing unit 50 during operation. The processing unit 50 forms a second parameter which includes a second position parameter and a second distance parameter according to the digital image "DI". The second position parameter may include an average coordinate of the images of the reference points 22 and 24 after being moved according to a plane space formed by the sensing array of the image sensor 32, e.g. a plane space having the center "+" of the sensing array as the original point; the second distance parameter may include a distance between the images of the reference points 22 and 24 after being moved according to the same plane space. The processing unit 50 calculates a displacement ΔS of the images $i_{22}$ and $i_{24}$ according to the compensated first parameter and the second parameter, and the second parameter is compensated by the aforementioned distance and angle compensations during calculation (step 710) so as to be able to correctly control the cursor. Since the compensations held on the second parameter are identical to that held on the first parameter, the details will not be described herein. Then, the processing unit 50 wirelessly or electrically transmits the displacement ΔS to the image display 10. Preferably, an application software is installed in the image display 10 for controlling the user interface and the cursor. After the image display 10 receives the signal of the displacement, it is able to accordingly control the cursor 14 to move on the screen 12 (step 700). In addition, during the calculation of the displacement ΔS of the images $i_{22}$ and $i_{24}$, a set of scale factors) $X_{scale}$ and $Y_{scale}$ can be inputted thereto (step 720) so as to control the motion sensitivity of the cursor 14 on the screen 12. For instance, the displacement ΔS can be controlled according to equation (3), $$\Delta S = \left(\frac{\Delta S_X}{X_{scale}}, \frac{\Delta S_Y}{Y_{scale}}\right) \quad (3)$$

where $\Delta S_X$ denotes a horizontal component of the displacement and $\Delta S_Y$ denotes a vertical component of the displacement. It could be seen from equation (3) that, if the values of $X_{scale}$ and $Y_{scale}$ become larger, the motion sensitivity of the cursor 14 becomes smaller, i.e. the moving distance of the aiming point of the remote controller 30 has to be relatively large so as to obtain the same moving distance of the cursor 14 on the screen 12; on the contrary, if the values of $X_{scale}$ and $Y_{scale}$ become smaller, the motion sensitivity of the cursor 14 becomes larger, i.e. the moving distance of the aiming point of the remote controller 30 need not to be so large to obtain the same moving distance of the cursor 14 on the screen 12. In this manner, the practicability of the cursor control apparatuses 1 and 1' can be increased.

The cursor control method of the present invention can be adapted to control a television which uses a user interface as a control interface, and a remote controller using the cursor control method of the present invention is for controlling the motion of a cursor shown on the user interface. In this manner, the remote controller can be operated as a mouse to control the television such that the buttons disposed on the remote controller can be reduced, e.g. normally a mouse having only two buttons, so as to effectively reduce the operational complexity of the television remote control.

As mentioned above, since the conventional pointer positioning device has to capture the whole image screen during operation, the size of the sensing array of the image sensor has to be increased and therefore the manufacturing cost is also increased. Furthermore, images shown on the screen will influence the image recognition, and thus the images of the reference points are not easy to be recognized. In addition, in the conventional cursor control apparatus, angle and distance compensations are not performed, and thus error control may be introduced during operation. The cursor control method and apparatus (as shown in FIGS. 1a, 1b and 3) of the present invention can not only solve the above problems, but further has the merits of high control accuracy, low manufacturing cost, increased operational convenience and practicability.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A cursor control method for controlling the movement of a cursor on an image display, the method comprising the steps of:
   providing at least two reference points for generating light of a predetermined spectrum and defining a predetermined area;
   providing an image sensor for pointing inside the predetermined area;
   receiving the light of the predetermined spectrum by the image sensor to form a digital image;
   identifying positions and shapes of the images of the reference points on the digital image to form a first parameter comprising a first position parameter of the images of the reference points;
   performing distance and angle compensations on the first parameter, wherein the angle compensation is implemented according to an equation between the first position parameter and a predetermined position parameter of the images of the reference points thereby compensating the images of the reference points to under the same basis;
   moving the aiming point of the image sensor inside the predetermined area to form a second parameter; and
   calculating a displacement of the images of the reference points on the digital image according to the compensated first parameter and the second parameter so as to accordingly control the movement of the cursor.

2. A cursor control apparatus for controlling the movement of a cursor on an image display, the apparatus comprising:
   at least two reference points configured to generate light of a predetermined spectrum and define a predetermined area;
   an image sensor configured to point inside the predetermined area to receive the light of the predetermined spectrum to form a digital image; and
   a processing unit configured to receive the digital image so as to accordingly control the movement of the cursor according to a displacement of the images of the reference points on the digital image, wherein the processing unit is further configured to identify positions and shapes of the images of the reference points on the digital image to form a first parameter comprising a first position parameter of the images of the reference points, and to perform an angle compensation on the first parameter according to an equation between the first position parameter and a predetermined position parameter of the images of the reference points thereby compensating the images of the reference points to under the same basis.

3. A cursor control method for controlling the movement of a cursor on an image display, the method comprising the steps of:
   providing at least two reference points having different shapes for generating light of a predetermined spectrum and defining a predetermined area;
   providing an image sensor for pointing inside the predetermined area; receiving the light of the predetermined spectrum by the image sensor to form a digital image;
   identifying positions and individual shapes of the images of the reference points on the digital image to form a first parameter comprising a first position parameter of the images of the reference points;

performing distance and angle compensations on the first parameter, wherein the angle compensation is implemented according to an equation between the first position parameter and a predetermined position parameter of the images of the reference points thereby compensating the images of the reference points to under the same basis;

moving the aiming point of the image sensor inside the predetermined area to form a second parameter; and calculating a displacement of the images of the reference points on the digital image according to the compensated first parameter and the second parameter so as to accordingly control the movement of the cursor on the image display.

* * * * *